UNITED STATES PATENT OFFICE.

ROBERT COTTER, OF HOUSTON, TEXAS, ASSIGNOR TO R. COTTER & CO., OF SAME PLACE.

IMPROVEMENT IN PREPARATIONS OF CHEWING-GUM.

Specification forming part of Letters Patent No. 195,579, dated September 25, 1877; application filed June 23, 1877.

*To all whom it may concern:*

Be it known that I, ROBERT COTTER, of Houston, in the county of Harris and State of Texas, have invented a new and useful Improvement in Process of Preparing Chewing-Gum; and I do hereby declare that the following is a full, clear, and exact description of the same.

My invention relates to the production of an improved merchantable chewing-gum; and it consists in the process of reducing the gum of the sapota tree to the proper consistency by first pulverizing, then sifting, and afterward subjecting the same to a gentle heat.

The basis which I employ in the manufacture of this gum is the dried juices of the sapota, a tree of the genus *Achras*, (*Achras sapota*,) which is found in Mexico and other parts of the tropics, and from which, when the tree is wounded, exudes a gum, which is known as "Mexican gum." This gum, as prepared in its native state, is run into blocks, and exists as a hard brittle substance, which has not been heretofore utilized. In reducing it to the proper pulpy consistency, I first powder and sift the gum finely, and then reduce it to a soft pulpy condition by the aid of heat, using a water-bath, steam, or any other means for applying the heat gradually.

This process is the only one which, after numerous experiments, I have found will reduce the brittle gum to a soft pulpy condition fit for use, the gum itself containing sufficient aqueous properties to cause it to remain in this state.

This soft pulpy product I put up and utilize in the form of merchantable chewing-gum, by reason of its suitable consistency for this purpose and its inert and harmless properties.

Having thus described my invention, what I claim as new is—

The process of preparing the gum of the sapota tree for chewing-gum, which consists in the successive steps of pulverizing, sifting, and subjecting to a gentle heat, as described.

ROBERT COTTER.

Witnesses:
  J. R. MORRIS,
  C. W. ALSWORTH.